United States Patent
Dhara et al.

(10) Patent No.: US 7,888,447 B2
(45) Date of Patent: Feb. 15, 2011

(54) POLYCARBONATE-POLYSILOXANE COPOLYMERS, METHODS FOR THE PREPARATION THEREOF, AND ARTICLES DERIVED THEREFROM

(75) Inventors: Dibakar Dhara, Bangalore (IN); Katherine Glasgow, Evansville, IN (US); Brian D. Mullen, Mt. Vernon, IN (US); Vikram Kumar, Bangalore (IN); Mark D. Leatherman, Stamford, CT (US); Suresh Rajaraman, Newburgh, NY (US); Anubhav Saxena, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 814 days.

(21) Appl. No.: 11/693,006

(22) Filed: Mar. 29, 2007

(65) Prior Publication Data

US 2008/0242804 A1   Oct. 2, 2008

(51) Int. Cl.
  *C08G 77/04*   (2006.01)
(52) U.S. Cl. .......................... 528/26; 525/464; 528/25; 528/29; 528/31
(58) Field of Classification Search .................... 528/26
  See application file for complete search history.

(56) References Cited

U.S. PATENT DOCUMENTS

| | | | |
|---|---|---|---|
| 3,796,676 A * | 3/1974 | Kanner et al. ............... | 521/112 |
| 5,530,083 A | 6/1996 | Phelps et al. | |
| 5,542,960 A | 8/1996 | Grabowski | |
| 5,616,674 A | 4/1997 | Michel et al. | |
| 6,146,757 A * | 11/2000 | Mor et al. ................... | 428/364 |
| 6,252,013 B1 | 6/2001 | Banach et al. | |
| 6,492,481 B1 | 12/2002 | Davis et al. | |
| 6,723,864 B2 | 4/2004 | Silva et al. | |
| 6,749,721 B2 | 6/2004 | Shannon et al. | |
| 6,780,956 B2 | 8/2004 | Davis | |
| 6,833,422 B2 | 12/2004 | Silva et al. | |
| 7,211,330 B2 * | 5/2007 | Putzer ....................... | 428/447 |
| 2007/0129492 A1 * | 6/2007 | Colborn et al. ............. | 525/100 |

FOREIGN PATENT DOCUMENTS

EP   1 142 933 A1   10/2001

OTHER PUBLICATIONS

International Search Report; International Application No. PCT/US2007/074065; Mailing date: Dec. 20, 2007; 5 pages.
Written Opinion of the International Searching Authority; International Application No. PCT/US2007/074065; Mailing date: Dec. 20, 2007; 6 pages.

* cited by examiner

*Primary Examiner*—Randy Gulakowski
*Assistant Examiner*—Lindsay Nelson
(74) *Attorney, Agent, or Firm*—Cantor Colburn LLP

(57) ABSTRACT

A polycarbonate-polysiloxane copolymer comprising structural units of the formula:

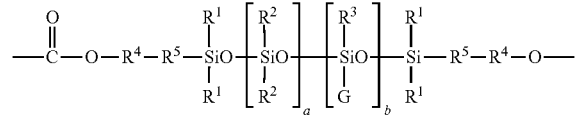

wherein each $R^1$, $R^2$, and $R^3$ is independently the same or different monovalent $C_{1-12}$ should this be C1-C13 like in the document? hydrocarbon group, G comprises a monovalent $C_{6-1000}$ poly(oxyalkyl) group, each $R^4$ and $R^5$ taken together is independently the same or different divalent $C_{3-30}$ hydrocarbon linking group wherein $R^4$ is a $C_{1-28}$ hydrocarbon and $R^5$ is a $C_{2-29}$ aliphatic group, a is 0 or greater, and b is one or greater; and structural units of the formula:

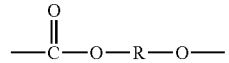

wherein each R is independently the same or different $C_{6-60}$ divalent hydrocarbon group, and at least 60% of the R groups comprise aromatic moieties.

26 Claims, No Drawings

POLYCARBONATE-POLYSILOXANE COPOLYMERS, METHODS FOR THE PREPARATION THEREOF, AND ARTICLES DERIVED THEREFROM

BACKGROUND

This disclosure relates generally to polycarbonate-polysiloxane copolymer compositions and methods for their manufacture, as well as articles formed from the compositions.

Polycarbonate is a thermoplastic that is particularly suitable for use in articles employed in medical applications because of the high reliability and safety benefits resulting from its optical transparency, toughness, and heat resistance. However, one drawback of polycarbonates for certain medical applications is that they are known to adversely interact with blood as well as protein solutions. For example, when blood contacts standard polycarbonate, the number of platelets in the blood can be reduced, or when a solution containing proteins contacts polycarbonate, proteins can be deposited on the surface of the polycarbonate. A more hemocompatible polycarbonate composition comprising a polycarbonate-polysiloxane copolymer has recently been introduced, where the inclusion of the polycarbonate-polysiloxane copolymer improves the hemocompatibility of the polycarbonate. This recently introduced copolymer does not contain poly(oxyalkyl) groups as described below.

Other approaches to improving the hemocompatibility of materials such as polycarbonate have relied on the use of hemocompatible coatings applied to the surface of the article, wherein the coating includes bioactive molecules such as heparin or phosphorylcholine. Alternatively, grafting of hydrophilic polymeric moieties to the surface of the polymer has been performed. However, it is difficult to use conventional molding processes to make such surface-modified polymers without a secondary operation.

There accordingly remains a need in the market for hemocompatible and/or protein resistant polycarbonate compositions, and methods for their manufacture.

BRIEF DESCRIPTION

The above-described and other deficiencies of the art are met by a polycarbonate-polysiloxane copolymer comprising structural units of the formula (1):

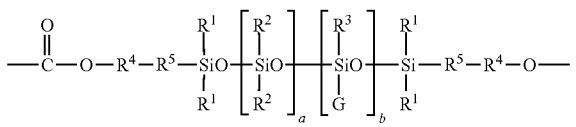

(1)

wherein each $R^1$, $R^2$, $R^3$ is independently the same or different monovolanet $C_{1-13}$ hydrocarbon group, G comprises a monovalent $C_{6-1000}$ poly(oxyalkyl) group, each $R^4$ and $R^5$ taken together is independently the same or different divalent $C_{3-30}$ hydrocarbon linking group wherein $R^4$ is a $C_{1-28}$ hydrocarbon and $R^5$ is a $C_{2-29}$ aliphatic group, a is 0 or greater, and b is one or greater; and structural units of the formula (8):

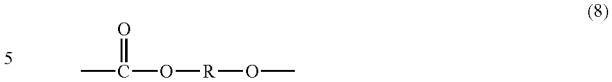

(8)

wherein R is a $C_{6-60}$ divalent hydrocarbon group, and at least 60% of the R groups comprise aromatic moieties.

In another embodiment, a method of preparing a polycarbonate-polysiloxane copolymer comprises reaction of a compound of the formula (12)

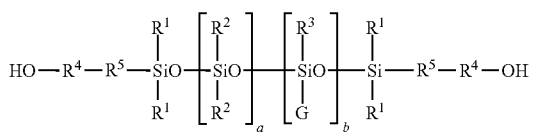

(12)

wherein each $R^1$, $R^2$, and $R^3$ is independently the same or different monovalent $C_{1-13}$ hydrocarbon group, G comprises a monovalent $C_{6-1000}$ poly(oxyalkyl) group, each $R^4$ and $R^5$ taken together is independently the same or different divalent $C_{1-30}$ hydrocarbon linking group wherein $R^4$ is a $C_{1-28}$ hydrocarbon and $R^5$ is a $C_{2-29}$ aliphatic group, is a 0 or greater, and b is one or greater, with a compound of the formula:

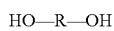

HO—R—OH wherein R is independently the same or different $C_{6-60}$ divalent hydrocarbon group, and at least 60% of the R groups comprise an aromatic moiety, in the presence of a carbonate precursor, to provide the polycarbonate-polysiloxane copolymer.

In still another embodiment, an article is provided, comprising the above-described polycarbonate-polysiloxane copolymer.

A method of manufacture of an article comprises molding, extruding, or shaping the above-described polycarbonate-polysiloxane copolymer.

The above described and other features are exemplified by the following detailed description.

DETAILED DESCRIPTION

The inventors hereof have found that a polycarbonate-polysiloxane composition having improved hemocompatibility and/or reduced protein adsorption is provided where at least one substituent of the polysiloxane moiety is a long-chain group, in particular a poly(oxyalkyl) group. The polycarbonate-polysiloxane copolymers can be obtained without substantially adversely affecting other advantageous properties of polycarbonate-polysiloxanes, including good impact strength, transparency, and/or heat resistance. In particularly advantageous feature, articles comprising the polycarbonate-polysiloxanes can be manufactured, e.g., by molding, without a secondary coating or grafting step.

Thus, the polycarbonate-polysiloxanes comprise structural units of formula (1):

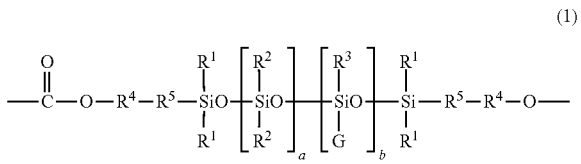
(1)

wherein G comprises a monovalent poly(oxyalkyl) group having 6 to about 1000 carbon atoms. G is attached to the silicon atom via a divalent hydrocarbon linker group having 2 to 20 carbon atoms. From 1 to 100, specifically 2 to 50, more specifically 5 to 30 alkoxy groups can be present (exclusive of the terminal alkoxy group), and each oxyalkyl group can be the same or different, and have 2 to 10 carbon atoms, specifically 2 to 6 carbon atoms, even more specifically 2 to 4 carbon atoms. The poly(oxyalkyl) group further generally comprises a terminal hydroxyl group or a terminal alkoxy group having 1 to 20 carbon atoms, specifically a hydroxyl or alkoxy group having 1 to 8, more specifically 1 to 6 carbon atoms.

In one embodiment, G, is of formula (2):

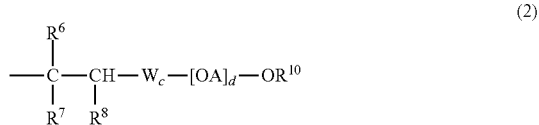
(2)

wherein $R^6$, $R^7$, and $R^8$ are each independently the same or different hydrogen atom or a monovalent $C_{1-8}$ hydrocarbon group, $R^{10}$ is a monovalent $C_{1-10}$ hydrocarbon group, W is a divalent $C_{1-18}$ hydrocarbon group, A is a divalent $C_{1-6}$ hydrocarbon group, c is 1, and d is 1 to 100, specifically 2 to 60, specifically 2 to 40, even more specifically 2 to 20. In an embodiment, c is 1 and W is a methylene group. In still another embodiment, W is methylene, c is one, and $R^6$, $R^7$, and $R^8$ are each a hydrogen atom. In still another embodiment, W is methylene, c is 1, $R^6$ $R^7$, and $R^8$ are each a hydrogen atom, and $R^{10}$ is a methyl. In still another embodiment, W is methylene, c is one, and $R^6$, $R^7$, $R^8$, and $R^{10}$ are each a hydrogen atom.

In a specific embodiment, G in formula (1) is a monovalent linker and poly(oxyalkyl) group of formula (3):

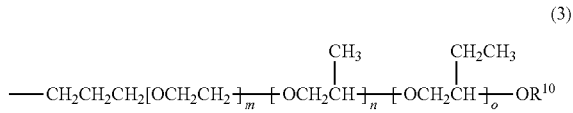
(3)

wherein $R^{10}$ is a hydrogen atom or a $C_{1-8}$ monovalent hydrocarbon group, m is 0 to 20, n is 0 to 20, and o is 0 to 20, provided that m+n+o is greater than 2. Specifically in formula (3), in an embodiment, m is 2 to 20, n is zero, o is zero, and $R^{10}$ is a $C_{1-4}$ alkyl group, specifically methyl.

Further in formula (1), each $R^1$, $R^2$, and $R^3$ is independently the same or different monovalent $C_{1-13}$ hydrocarbon group, specifically a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7C_{13}$ arylalkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. Combinations of the foregoing groups can be used in the same copolymer. Non-limiting examples of suitable groups include methyl, ethyl, sec-butyl, tert-butyl, octyl, decyl, dodecyl, cetyl, hydroxypropyl, 2,5,8-trioxadecyl, triacontyl, 3,3,3-trifluoropropyl, methoxy, ethoxy, butoxy, phenyl, and phenyloxy. A mixture of aliphatic and aromatic groups can be used, e.g., $R^1$ can be aliphatic and each $R^2$ can be aromatic, for example phenyl. In another specific embodiment, each $R^1$, $R^2$, and $R^3$ is independently the same or different $C_{1-3}$ alkyl or $C_{1-3}$ fluoroalkyl group, more specifically, each $R^1$, $R^2$, $R^3$ is methyl.

Also in formula (1), is a 0 or greater, and b is one or greater, wherein a+b is 1 to 300. Specifically, a can be 5 to 200, specifically 10 to 100, more specifically 20 to 75, even more specifically 22 to 45, and b can be 1 to 100, specifically 2 to 50, more specifically 3 to 25, even more specifically, 3 to 15. In one embodiment, a is 20 to 75 and b is 3 to 15, or a is 22 to 45 and b is 3 to 12.

Further in formula (1), $R^4$ and $R^5$ taken together form a divalent $C_{3-30}$ linking group wherein $R^4$ is a $C_{1-28}$ hydrocarbon and $R^5$ is a $C_{2-29}$ aliphatic group. Each instance of $R^4$ and $R^5$ taken together can be the same or different. A wide variety of linking groups can be used. In one embodiment, each $R^4$ is independently the same or different substituted or unsubstituted $C_{6-28}$ aromatic group, and each $R^5$ is independently the same or different substituted or unsubstituted $C_{2-29}$ aliphatic group. Specific substituents include hydroxy, $C_{1-6}$ alkyl, $C_{1-6}$ fluoroalkyl, $C_{1-6}$ alkoxy, $C_{6-12}$ phenoxy, and halogen groups. A combination of different substituents can be present.

In one embodiment, each $R^4$ is independently the same or different substituted or unsubstituted phenyl, and each $R^5$ is independently the same or different unsubstituted $C_{2-12}$ aliphatic group, more specifically an unsubstituted $C_{2-6}$ aliphatic group. Specific substituents for the phenyl in this embodiment include $C_{1-6}$ alkoxy, more specifically methoxy. More particularly, each $R^4$ and $R^5$ taken together are the same, and are a group of formula (4):

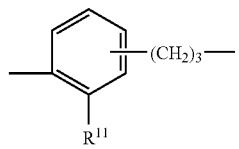
(4)

wherein $R^{11}$ is a hydrogen atom or a $C_{1-6}$ alkoxy group. In a specific embodiment, $R^{11}$ is a hydrogen atom or a methoxy. In yet another embodiment, each $R^4$ and $R^5$ taken together is the same, and is a group of the formulas (5), (6), or (7):

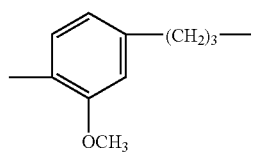
(5)

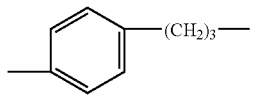 (6)

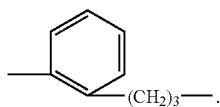 (7)

The polycarbonate-polysiloxane copolymer further comprises carbonate units of formula (8):

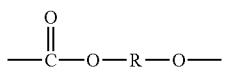 (8)

in which at least about 60 percent of the total number of R groups contain aromatic moieties, and the balance thereof are aliphatic, alicyclic, or aromatic groups. In an embodiment, R is a $C_{6-30}$ hydrocarbon that contains at least one aromatic moiety.

R can be derived from a dihydroxy compound of the formula HO—R—OH, in particular a dihydroxy compound of formula (9):

HO-A$^1$-Y$^1$-A$^2$-OH                                    (9)

wherein each of A$^1$ and A$^2$ is a monocyclic divalent aromatic group and Y$^1$ is a single bond or a bridging group having one or more atoms that separate A$^1$ from A$^2$. In an exemplary embodiment, one atom separates A$^1$ from A$^2$. Specifically, R can be derived from a dihydroxy aromatic compound of formula (10)

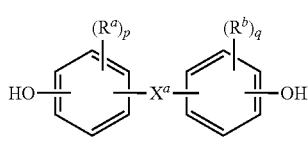 (10)

wherein R$^a$ and R$^b$ each represent a halogen or $C_{1-12}$ alkyl group and can be the same or different; and p and q are each independently the same or different integers of 0 to 4. Also in formula (10), X$^a$ represents a bridging group connecting the two hydroxy-substituted aromatic groups, where the bridging group and the hydroxy substituent of each C$_6$ arylene group are disposed ortho, meta, or para (specifically para) to each other on the C$_6$ arylene group. In an embodiment, the bridging group X$^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogen, oxygen, nitrogen, sulfur, silicon, or phosphorous. The $C_{1-18}$ organic group can be disposed such that the C$_6$ arylene groups connected thereto are each connected to a common alkylidene carbon or to different carbons of the $C_{1-18}$ organic bridging group. In one embodiment, p and q is each 1, and R$^a$ and R$^b$ are each a $C_{1-3}$ alkyl group, specifically methyl, disposed meta to the hydroxy group on each arylene group, and X$^a$ is a $C_{1-3}$ aliphatic group, specifically isopropylidene. In another embodiment, p and q are each zero, and X$^a$ is a $C_{1-3}$ aliphatic group, specifically isopropylidene.

Other useful aromatic dihydroxy compounds of the formula HO—R—OH include compounds of formula (11)

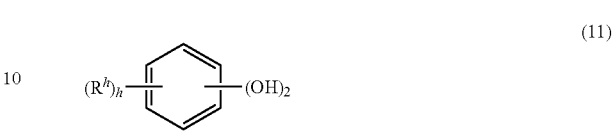 (11)

wherein each R$^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and h is 0 to 4. The halogen is usually bromine.

Some illustrative examples of specific aromatic dihydroxy compounds include the following 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4- hydroxyphenyl)propane, 2,2-bis(3-cyclohexyl-4-hydroxyphenyl)propane, 2,2-bis (3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6- hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl) phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis (4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

The polycarbonate-polysiloxane copolymer is prepared by the reaction of a dihydroxy polysiloxane corresponding to the units of formula (1) (i.e., the dihydroxysilane of formula (12), described in further detail below) with the dihydroxy compound HO—R—OH in the presence of a carbonate source. Conditions are similar to those useful in forming polycarbonates. In one embodiment, the reaction is an interfacial polymerization in the presence of a two-phase solvent medium and an optional phase transfer catalyst. Alternatively, the polysiloxane-polycarbonate copolymers can be prepared by a melt process, that is, by co-reacting in a molten state, the dihydroxy monomers and a diaryl carbonate ester, such as diphenyl carbonate, in the presence of a transesterification catalyst.

Although the reaction conditions for interfacial polymerization can vary, an exemplary process generally involves dissolving or dispensing the dihydroxy compound HO—R—OH in aqueous caustic soda or potash, adding the resulting mixture to a water-immiscible solvent medium, and contacting the reactants with a carbonate precursor in the presence of a catalyst such as triethylamine, and optionally a phase transfer catalyst, under controlled pH conditions, e.g., about 8 to about 12. The mixture is then combined with the other dihydric reactant, i.e., the dihydroxy polysiloxane.

In a specific exemplary process, the dihydroxy compound HO—R—OH is dissolved in aqueous caustic soda or potash, the resulting mixture is added to a water-immiscible solvent medium such as dichloromethane, and then contacted with a carbonate precursor in the presence of a phase transfer catalyst to generate oligomeric and monomeric chloroformates, under controlled pH conditions, e.g., 6 to 8. The mixture is then combined with the dihydroxy polysiloxane and stirred at a pH of 10 to 13 for 5 to 20 minutes. A catalyst such as triethylamine is then added, as well as a carbonate precursor, and optionally more dihydroxy compound HO—R—OH, to build higher molecular weight polycarbonate-co-polysiloxane copolymers.

In still another a specific embodiment, in a continuous flow reactor (e.g., a tube reactor), the dihydroxy polysiloxane (12), dissolved in a water-immiscible solvent such as methylene chloride, is converted by the action of phosgene and aqueous base into a mixture of mono- and bisphenol chloroformates. The mixture of chloroformates are then treated with a catalyst, additional aqueous caustic, the dihydroxy compound HO—R—OH (e.g., bisphenol A), and a monophenol end capping agent to afford polycarbonate polysiloxane-copolymers. The chloroformate mixture can be transferred from the tube reactor an interfacial polymerization reactor prior to be reacted with the dihydroxy compound HO—R—OH.

Alternatively, in a continuous flow reactor (e.g., a tube reactor), one or more dihydroxy compounds HO—R—OH (e.g., bisphenol A) is converted by the action of phosgene and aqueous base into a mixture of mono-, bis-, and oligomeric chloroformates at a pH of 6 to 8 in the presence of a water-immiscible solvent such as dichloromethane and a phase transfer catalyst. The reaction mixture is then treated with a dihydroxy polysiloxane and stirred for 5 to 20 min at pH 10 to 13. Then, more dihydroxy compound (e.g., bisphenol A) is added and reacted with a carbonate precursor, such as phosgene at pH 9 to 12. Subsequently, a tertiary amine catalyst is added and the mixture is again stirred with phosgene at pH 8 to 12 until the desired polycarbonate-polysiloxane molecular weight is obtained. Again, the chloroformate mixture can be transferred from the tube reactor to an interfacial polymerization reactor to complete the polymerization process at any point after formation.

The most commonly used water immiscible solvents include methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone,) or a glycol (e.g., the bishaloformate of ethylene glycol, neopentyl glycol, polyethylene glycol,). Combinations comprising at least one of the foregoing types of carbonate precursors can also be used.

Exemplary catalysts include trialkylamine catalysts, for example, triethylamine, or trialkylamines bearing at least one methyl group on nitrogen, such as N,N-dimethylbutylamine (DMBA).

Among the phase transfer catalysts that can be used are catalysts of the formula $(R^{12})_4Q^+X$, wherein each $R^{12}$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group.

Alternatively, melt processors can be used to make the polycarbonate-polysiloxane copolymers. Generally, in the melt polymerization process, polycarbonate-polysiloxane is prepared by co-reacting, in a molten state, the dihydroxy reactant(s) and a diaryl carbonate ester, such as diphenyl carbonate, with a dihydroxy polysiloxane in the presence of a transesterification catalyst in a melt reactor. Volatile monohydric phenol is removed from the molten reactants by distillation and the polymer is isolated as a molten residue. Specific diaryl carbonate esters have electron-withdrawing substituents on the aryl groups, for example 4-nitrophenyl) carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate. A combination comprising at least one of the foregoing can be used. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, tetraphenylphosphonium phenolate, or a combination comprising at least one of the foregoing.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and combinations comprising at least one of the foregoing functional groups. Specific examples include trimellitic acid, trimellitic anhydride, trimellitic trichloride, tris-p-hydroxy phenyl ethane, isatin-bis-phenol, tri-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of about 0.05 to about 2.0 wt %.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and mono-chloroformates. Mono-phenolic chain stoppers are exemplified by monocyclic phenols such as phenol; $C_1$-$C_{22}$ alkyl-substituted phenols such as p-cumylphenol, p- and tertiary-butyl phenol, and $C_8$-$C_9$ branched chain alkyl-substituted phenols; monoethers of diphenols such as p-methoxyphenol; monoesters of diphenols such as resorcinol monobenzoate; and certain mono-phenolic UV absorbers, for example 4-substituted-2-hydroxybenzophenones and their derivatives, aryl salicylates, 2-(2-hydroxyaryl)-benzotriazoles and their derivatives, 2-(2-hydroxyaryl)-1,3,5-triazines and their derivatives, and the like. Mono-carboxylic acid chlorides that can be used as chain stoppers include benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, trimellitic anhydride chloride, and naphthoyl chloride. Chlorides of aliphatic monocarboxylic acids with less than or equal to about 22 carbon atoms are useful, as well as chlorides of functionalized aliphatic monocarboxylic acids such as acryloyl chloride and methacryloyl chloride. Also useful are mono-chloroformates, such as phenyl chloroformate, alkyl-substituted phenyl chloroformate, p-cumyl phenyl chloroformate, and toluene chloroformate. A combination comprising at least one of the foregoing capping agents can be used.

The relative ratios of the polysiloxane and non-polysiloxane units in the polycarbonate can vary widely, depending on the number of poly(oxyalkyl) groups in each polysiloxane unit and the desired properties of the copolymer. A mixture of different types of each of the polysiloxane and non-polysiloxane units can also be present. In general, the copolymers are manufactured from a composition comprising about 0.1 to about 30 weight percent of the dihydroxy silicone (12) and about 70 to about 99.9 weight percent of the non-siloxane dihydroxy compound HO—R—OH. In a specific embodiment, the copolymers are manufactured from a composition comprising about 1 to about 20 weight percent of the dihydroxy silicone (12) and about 80 to about 99 weight percent of the non-siloxane dihydroxy compound HO—R—OH.

The polycarbonate-polysiloxane copolymers can be manufactured to have a weight average molecular weight of 10,000 to 100,000 Daltons, measured via gas permeation chromatography (GPC) using polycarbonate standards. The copolymers can further be manufactured to have a glass transition temperature of 110° C. to 155° C., specifically 140° C. to 150° C.

Silicones with two terminal hydroxyl groups can be used in the manufacture of the polycarbonate-polysiloxane copolymers. Such dihydroxy silicones are of formula (12):

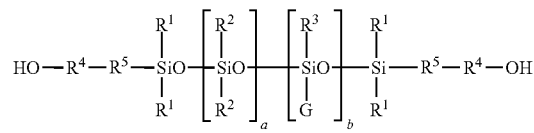

wherein $R^1$, $R^2$, $R^3$, $R^4$, $R^5$, a, and b are as defined above. Compounds of formula (12) can be prepared by a general process as follows.

In one general method for the manufacture of dihydroxy silicones of formula (12), the linking group portion of the molecule (—$R^4$—$R^5$—) is prepared by the hydrosilylation of the corresponding hydroxy-substituted terminally unsaturated compound, wherein the hydroxy group is located within the $R^4$ group and the unsaturation is located within the $R^5$ group. Thus, for compounds wherein —$R^4$—$R^5$— is of formula (4) for example, the corresponding terminally unsaturated compound is an unsaturated hydroxyaromatic compound of formula (13)

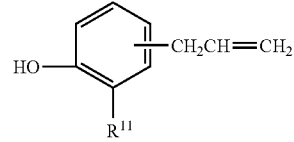

wherein $R^{11}$ is a hydrogen atom or a $C_{1-6}$ alkoxy. The hydroxy-substituted terminally unsaturated compound corresponding to —$R^4$—$R^5$— is reacted with a hydride-capped silicone of the formula (14)

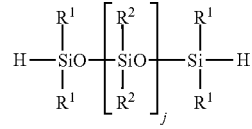

to produce intermediate (15)

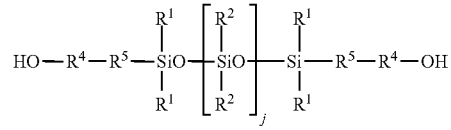

wherein $R^1$, $R^2$, $R^3$, $R^4$, and $R^5$ are as defined above, and j is an integer of 0 or 1 or greater, specifically 2 to 200, more specifically 5 to 70, even more specifically 10 to 70.

Hydrosilylation reactions are generally carried out in the presence of a catalyst such as an organic peroxide (e.g., benzoyl peroxide, 2,5-dimethyl-2,5-di(tert-butylperoxy)hexane, and the like), an organic azo compound, or known organometallic complexes of a transition metal such as platinum or rhodium. Usually, the platinum catalyst is introduced in a latent form such that the active form can be generated by application of an external stimulus, such as thermal energy or photochemical energy. For example, a platinum complex of 1-ethynyl-cyclohexan-1-ol can be used as the latent form of the catalyst. When the hydrosilylation reaction mixture is heated, the platinum complex releases 1-ethynyl-cyclohexan-1-ol, thereby releasing an active form of the platinum catalyst. Other catalysts known in the art, such as, sodium propionate can also be used. Mixtures of catalysts can also be used.

Intermediate (15) is then reacted with a cyclic hydrosiloxane of formula (16)

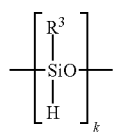

(16)

wherein $R^3$ is as defined above and k is an integer of 3-12. Non-limiting examples of cyclic hydrosiloxanes of formula (16) include tetramethyltetrahydrocyclotetrasiloxane, tetrabutyltetrahydrocyclotetrasiloxane, tetraphenyltetrahydrocyclotetrasiloxane, and trimethyltrihydrocyclotrisiloxane. Reaction of intermediate (15) with cyclic hydrosiloxane (16) produces hydride (17)

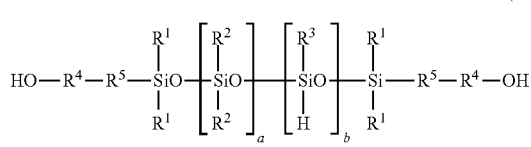

(17)

wherein $R^1$, $R^2$, $R^3$, $R^4$, $R^5$, a, and b are as defined above. Reaction is under conditions selected to effect a redistribution reaction, and which produces the silicone hydride of formula (17). A catalyst is generally used to facilitate redistribution, for example alkali metal hydroxides such as cesium hydroxide, or an inorganic acid such as sulfuric acid. The number of hydride units obtained in the silicone hydride of formula (17) can be adjusted by controlling the molar ration of the Si—H units in the cyclic hydrosiloxane and the intermediate (15). The product (17) can be characterized by infrared (IR) spectroscopy. $^1$H and $^{29}$Si nuclear magnetic resonance (NMR) spectroscopy and liquid chromatography-mass spectroscopy (LC-MS) techniques to verify and quantify the purity of the product. $^{29}$Si NMR indicated that incorporation of the Si—H moieties into the silicone hydride (17) was random.

Next, the silicone hydride of formula (17) is reacted with an ally-terminated poly(oxyalkyl) compound, e.g., a compound of formula (18)

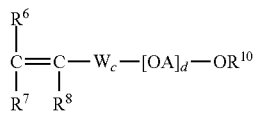

(18)

wherein $R^6$, $R^7$, $R^8$, $R^{10}$, A, c and d are as defined above to form the dihydroxy silicone (12). In a specific embodiment, the silicone hydride of formula (17) is reacted with an allyl-terminated poly(oxyalkyl) compound of formula (19):

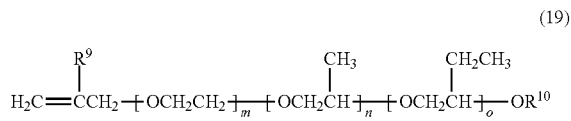

(19)

wherein $R^9$ is hydrogen and $R^{10}$, m, n, and o are as defined above. Some allyl-terminated poly(oxyalkyl) compounds are commercially available from Clariant Corporation and Momentive Performance Materials.

In practice, when an allyl-terminated poly(oxyalkyl) compound of formulas (18) or (19) wherein $R^9$ is a hydrogen atom, and a platinum catalyst are used in the hydrosilylation step, the allyl group undergoes a rearrangement to the isomeric 1-propenyl form, which can participate in a competing hydrosilylation reaction with the silicone hydride of formula (17). In order to prevent the competing reaction, an excess (20 mole percent or higher, specifically 30 mole percent or higher) of the allyl-terminated poly(oxyalkyl) compound of formulas (18) or (19) over the silicone hydride of formula (17) is used.

In addition to the polycarbonate-polysiloxane copolymer described above, a thermoplastic composition can include various additives ordinarily incorporated in polymer compositions of this type, with the proviso that the additives are selected so as to not significant adversely affect the desired properties of the thermoplastic composition, for example, transparency. Exemplary additives include such as an antioxidant, a heat stabilizer, a light stabilizer, an ultraviolet light absorber, a plasticizer, a mold release agent, a lubricant, an antistatic agent, a pigment, a dye, a quencher, a flame retardant, or a gamma stabilizer. Combinations of additives can be used. Such additives can be mixed at a suitable time during the mixing of the components for forming the composition.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentacrythritol diphosphite, alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amide of beta-(3,5-di-tert-butyl-4-hydroxyphenyl)-propionic acid, or combinations comprising at least one of the foregoing antioxidants. Antioxidants are generally used in amounts of 0.0001 to 1 parts by weight, based on 100 parts by weight of the polycarbonate-polysiloxane copolymer.

Exemplary heat stabilizer additives include organophosphites such as triphenyl phosphite, tris-(2,6-dimethylphenyl) phosphite, tris-(mixed mono-and di-nonylphenyl)phosphite; phosphonates such as dimethylbenzene phosphonate, phosphates such as trimethyl phosphate, or combinations comprising at least one of the foregoing heat stabilizers. Heat stabilizers are generally used in amounts of 0.0001 to 1 parts by weight, based on 100 parts by weight of the polycarbonate-polysiloxane copolymer.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are generally used in amounts of 0.0001 to 1 part by weight, based on 100 parts by weight of the polycarbonate-polysiloxane copolymer.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2yl]5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3, 3-diphenylacryloyl)oxy]methyl] propane (UVINUL® 3030); 2,2'-(1,4-phenylene) bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to about 100 nanometers; or combinations comprising at least one of the foregoing UV absorbers. UV absorbers are generally used in amounts of 0.0001 to 10 parts by weight, based on 100 parts by weight of the polycarbonate-polysiloxane copolymer.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such s beeswax, montan wax, and paraffin wax. Such materials are generally used in amounts of 0.0001 to 10 parts by weight, based on 100 parts by weight of polycarbonate-polysiloxane copolymer.

Thermoplastic compositions comprising the polycarbonate-polysiloxane copolymers can further include another polymer, for example a homopolycarbonate, a different type of polycarbonate copolymer (e.g., a polycarbonate comprising units derived from bisphenol A and unites derived from PPPBP), a polycarbonate-polyester, a polyester, or a mixture comprising at least one of the foregoing types of polymers. In this embodiment, the polymer component of the thermoplastic composition comprises 1 to 99.5 weight percent, specifically 50 to 99 weight percent, more specifically 80 to 98 weight percent of the homopolycarbonate, different type of polycarbonate copolymers, polycarbonate-polyester, polyester, or combinations thereof, with the balance being the polycarbonate-polysiloxane copolymer. Still other types of polymers, in particular thermoplastic polymers can also be present, for example up to 99 weight percent, more specifically up to 50 weight percent, still more specifically up to 25 weight percent, and even more specifically 1 to 10 weight percent of other polymers such as polyimides, polyetherimides, polyether ketones, and the like.

The thermoplastic compositions can be manufactured by various methods. For example, powdered polycarbonate-polysiloxane copolymer, and other optional components are first blended in a HERSCHEL-Mixer® high speed mixer. Other low shear processes, including but not limited to hand mixing, can also accomplish this blending. The blend is then fed in tot he throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Thermoplastic compositions comprising the polycarbonate-polysiloxane copolymers as described above have improved hemocompatibility and/or reduced protein adsorption. In addition, the polycarbonate-polysiloxane copolymers can be obtained without substantially adversely affecting other advantageous properties of polycarbonate-polysiloxanes, including good impact strength, transparency, and/or heat resistance.

For example, compositions comprising the polycarbonate-polysiloxane copolymers can have a transparency of greater than 50%, specifically greater than 70%, as measured using 3.2 plaques according to ASTM-D1003-00. The polycarbonate compositions can have a haze of less than 30% as measured using 3.2 mm thick plaques according to ASTM-D1003-00.

Compositions comprising the polycarbonate-polysiloxane copolymers can further have a Notched Izod Impact (NII) of greater than about 0.5 foot-pounds (ft-lb)/inch (26.7 Joules per meter, J/m), measured at 23° C. using ⅛inch thick bars (3.18 mm) in accordance with ASTM D256.

Shaped, formed, or molded articles comprising the polycarbonate-polysiloxane copolymers are also provided. The thermoplastic compositions can be molded into useful shaped articles by a variety of means such as injection molding, extrusion, rotational molding, blow molding and thermoforming to form articles for medical applications, such as sample holders, vials, bottles, syringe barrels, cardiotomy reservoirs, and the like.

In a particularly advantageous feature, articles comprising the polycarbonate-polysiloxanes can be manufactured, e.g., by molding, without a secondary coating or grafting step.

In addition, the copolymer compositions can be used for producing various types of formulations suitable for different end uses where a desirable combination of properties characteristic of a polycarbonate, a silicone, and a polyether, such as surface activity, friction reduction, lubricity, impact strength, hydrophilicity, and oleophilicity is desirable. Still other applications include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, windows, and the like.

The invention is further illustrated by the following non-limiting examples.

EXAMPLE 1

Preparation of Dihydroxy Silicone (12)

An exemplary process for the preparation of a dihydroxy silicone (12) wherein —$R^4$—$R^5$— is derived from eugenol, $R^1$, $R^2$, and $R^3$ are each methyl, a+b is about 52, and G is of formula (3) wherein $R^{10}$ is methyl, m is about 6, n is 0, and o is 0 is as follows. A compound of formula (15) wherein —$R^4$—$R^5$— is derived from eugenol, and $R^1$ and $R^2$ are methyl (CF2003 fluid, available from Momentive Performance Materials; 55 grams) and tetramethyltetrahydrocyclotetrasiloxane ($D_4^{11}$, 6.1 grams, from Gelest, Incorporated) is combined with sulfuric acid catalyst (0.3 gram) with stirring at room temperature. Immediately, the reaction mixture turned pink. Reaction progress was monitored by measuring the solids content of the reaction mixture. After being stirred at ambient temperature for 32 hours, the stirring was stopped. A pink mass settled at the bottom of the reaction mixture and was removed be decantation. The resulting reaction mixture was neutralized with sodium bicarbonate and then filtered to provide a pale yellow liquid which was stirred at 140° C. under vacuum to provide the desired eugenol-capped poly(dimethylsiloxane-co-methylhydrosiloxane) intermediate product (formula (17)). The eugenol-capped poly(dimethylsiloxane-co-methylhydrosiloxane) intermediate (100 grams), polyethylene glycol allyl ether (formula (19), where $R^9$ is H, m is 6, n is 0, o is 0, and $R^{10}$ methyl; molecular weight of approximately 350, 66 grams), Karstedt catalyst (equivalent to 10 ppm of platinum), and 30 milliliters of isopropanol were placed in a round-bottomed flask. The resulting mixture was stirred at 90° C. for 4 hours after which isopropanol was removed by distillation to furnish the compound of formula (12), as described above.

EXAMPLE 2

Interfacial Preparation of a Polycarbonate-polysiloxane Copolymer

To an 80 liter continuous stirred tank reactor (CSTR) equipped with an overhead condenser were charged a first lot of bisphenol A (2000 grams), methyl-tributylammonium chloride (20 grams, as a 70 percent weight by volume (w/v) solution in deionized water), methylene chloride (14 liters), deionized water (11.9 liters), para-cumyl phenol (10 grams), and sodium gluconate (10 grams). Phosgene (977 grams, at an addition rate of 80 grams per minute) was added to the resultant mixture. The pH of the mixture was adjusted and maintained between 6 and 8 during the addition of phosgene, using a 50 percent w/v solution of sodium hydroxide in deionized water. After the addition of phosgene was completed, the pH of the resultant mixture was adjusted to 10 in the same manner as described above. The CSTR was then charged with the dihydroxy silicone of Example 1 (125 grams) and methylene chloride (0.5 liters). The pH of the resultant mixture was then raised to 11. After stirring the mixture for about 10 minutes a second lot of bisphenol A (500 grams), methylene chloride (5 liters), deionized water (7 liters), and para-cumyl phenol (80 grams) were charged to the CSTR. Phosgene (220 grams, at an addition rate of 80 grams per minute) was added to the resultant mixture. The pH of the mixture was maintained between 9 and 10 during the addition of phosgene in the same manner as described above. Triethylamine (30 milliliters) and methylene chloride (0.25 liters) were added to the CSTR. This addition was followed by the addition of phosgene (400 grams, at an addition rate of 80 grams per minute). The pH of the resultant mixture was adjusted and maintained between 9 and 10 during the addition of phosgene in the same manner as described above. The resultant mixture was then purged with nitrogen gas for about 5 to 10 minutes. The mixture was allowed to stand for about 5 to 30 minutes and the mixture separated into an aqueous layer and an organic layer. The organic layer was extracted and washed with dilute hydrochloric acid and deionized water using centrifugation. The copolymer product was isolated by steam precipitation. Molding and testing of this copolymer is described in Example 8.

EXAMPLE 3

Interfacial Preparation of a Polycarbonate-polysiloxane Copolymer

To a 2 liter five necked round-bottomed flask were added a first lot of bisphenol A (25 grams), deionized water (200 milliliters), anhydrous methylene chloride HPLC grade (320 milliliters), para-cumyl phenol (1.40 grams), and methyltributylammonium chloride (0.3 milliliters). Phosgene (14 grams, at an addition rate of 2 grams per minute) was added to the resultant mixture. The pH of the mixture was maintained between 6 and 8 during the addition of phosgene, using a 50 percent w/v solution of sodium hydroxide in deionized water. After the addition of phosgene was completed the pH of the mixture was adjusted to 7 in the same manner as described above. A sample of the mixture was spotted on phosgene paper to ensure the presence of chloroformates. The dihydroxy silicone of Example 1 (3 grams) was added and the pH of the resultant mixture was raised to 10 to 11 in the same manner as described above. After stirring the mixture for about 10 to 15 minutes at the pH of 10 to 11 a second lot of bisphenol A (25 grams) was added to the mixture followed by the addition of phosgene (14 grams, at an addition rate of 2 grams per minute). The pH of the mixture was adjusted to 9 to 10 in the same manner as described above. Triethylamine (0.46 grams) was added to the mixture, and the resultant mixture was stirred for about 30 minutes until a sample of the mixture when spotted on phosgene paper indicated the absence of chloroformates. The copolymer was then isolated by washing with dilute hydrochloride acid, washing with deionized water three times, and precipitated into hot water. Molding and testing of this copolymer is described in Example 8.

EXAMPLE 4

Interfacial Preparation of a Polycarbonate-polysiloxane Copolymer

The same procedure used in Example 3 was used to prepare the copolymer except that 5 grams of the dihydroxy silicone of Example 1 was used. Triethylamine (0.46 grams) was added to the mixture and the mixture stirred for about 30 minutes. Spotting a sample of the mixture on phosgene paper ensured the absence of chloroformates in the reaction mixture. The pH of the mixture was then increased to 11 to 13 and the mixture maintained at this pH for about 30 minutes. The desired copolymer was then isolated in the same manner as described in Example 3. Molding and testing of this copolymer is described in Example 8.

EXAMPLE 5

Melt Preparation of a Polycarbonate-polysiloxane Copolymer

To a stainless steel cylindrical polymerization reactor having a length of 30 centimeter, diameter of 13.3 centimeter, and a volume of 3 liters, were charged bisphenol A (806.3 grams), bismethylsalicylcarbonate (BMSC, 1200 grams), The dihydroxy silicone of Example 1 (47.6 grams), sodium hydroxide ($2.13 \times 10^{-4}$ grams), and tetramethyl ammonium hydroxide (0.323 grams). The reactor was subjected to a vacuum of 0 millibar and then subsequently purged with nitrogen. This process of subjecting the reactor to vacuum followed by purging with nitrogen gas was repeated three times. Finally the pressure inside the reactor was raised to atmospheric pressure by nitrogen. The reactor was then heated to 180° C. in a period of about 15 minutes to provide a molten mixture of the contents. After holding at 180° C. and atmospheric pressure for about 20 minutes the stirrer was switched on. After stirring the mixture at 180° C. for 15 minutes, the temperature was increased to 220° C. under atmospheric pressure in a period of about 5 minutes. After holding at 220° C. and atmospheric pressure for about 25 minutes the temperature was increased to 230° C. in about 5 minutes and the pressure was reduced to 100 millibar in about 10 minutes. After holding at 230° C. and 100 millibar for about 15 minutes the temperature of the reactor was raised to 275° C. in about 5 minutes and the pressure was reduced to 0 millibar in about 5 minutes. After holding at 275° C. and 0 millibar for about 10 minutes the pressure inside the reactor was raised to atmospheric pressure and the desired copolymer was isolated in a yield of about 800 grams. Molding and testing of this copolymer is described in Example 8.

EXAMPLE 6

Melt Preparation of a Polycarbonate-polysiloxane Copolymer

The same procedure as used in Example 5 was followed except that 809.2 grams of bisphenol A and 18.4 grams of the dihydroxy silicone of Example 1 were used. The reactor was then heated to 180° C. under atmospheric pressure. After holding at 180° C. and atmospheric pressure for about 25 minutes the temperature was increased to 220° C. under atmospheric pressure in a period of about 5 minutes. After holding at 220° C. and atmospheric pressure for about 30 minutes the temperature was increased to 230° C. in about 5 minutes and the pressure was reduced to 100 millibar in about 10 minutes. After holding at 230° C. and 100 millibar for about 25 minutes the temperature of the reactor was raised to 275° C. in about 5 minutes and the pressure was reduced to 0 millibar in about 5 minutes. After holding at 275° C. and 0 millibar for about 15 minutes the pressure inside the reactor was raised to atmospheric pressure and the desired copolymer was isolated in a yield of about 800 grams. Molding and testing of this copolymer is described in Example 8.

EXAMPLE 7

Melt Preparation of a Polycarbonate-polysiloxane Copolymer

The same procedure as used in Example 5 was followed except in that 102.3 grams of the dihydroxy silicone of Example 1 was used. The reactor was then heated to 180° C. under atmospheric pressure. After holding at 180° C. and atmospheric pressure for about 55 minutes the temperature was increased to 220° C. under atmospheric pressure in a period of about 5 minutes. After holding at 220° C. and atmospheric pressure for about 30 minutes the temperature was increased to 230° C. in about 5 minutes and the pressure was reduced to 100 millibar in about 10 minutes. After holding at 230° C. and 100 millibar for about 20 minutes the temperature of the reactor was raised to 275° C. in about 5 minutes and the pressure was reduced to 0 millibar in about 5 minutes. After holding at 275° C. and 0 millibar for about 30 minutes the pressure inside the reactor was raised to atmospheric pressure and the desired copolymer was isolated in a yield of about 800 grams. As described in further detail in Example 8, this copolymer was compounded with two different polycarbonate homopolymers, molded, and then tested.

EXAMPLE 8

Molding and Characterization of Polycarbonate-polysiloxane Copolymers

The general procedures used for molding the copolymers prepared in Examples 2, 3 and 4 are as follows. The copolymer powder was compounded in a Wayne Machine and Die Co. single screw extruder with 0.75 inch diameter screw and a length/diameter ratio (L/D) equal to 38. The conditions used for compounding are shown in Table 1.

TABLE 1

| Process Parameter | Value |
| --- | --- |
| Temperature Zone 1 | 240° C. |
| Temperature Zone 2 | 250° C. |
| Temperature Zone 3 | 250° C. |
| Temperature of Die | 255° C. |
| Vacuum Applied | No |
| Screw Speed | 100 RPM |
| Current/Torque | 10 to 20 amperes |

The extruded pellets were dried in an oven maintained at 110° C. for about 4 hours. Then the dried pellets were subjected to molding using a LTM-Demag molding machine (60T) to provide Petri dishes, using the conditions shown in Table 2.

TABLE 2

| Process Parameters | Value |
| --- | --- |
| Feed zone temperature (° C.) | 110 |
| Zone 1 temperature (° C.) | 260 |
| Zone 2 temperature (° C.) | 270 |

TABLE 2-continued

| Process Parameters | Value |
| --- | --- |
| Zone 3 temperature (° C.) | 275 |
| Nozzle Temperature (° C.) | 280 |
| Mold temperature (° C.) | 80 |
| Sample drying time (hours) | 4 |
| Sample drying temperature | 110 |
| Cycle time (seconds) | 30 |
| Injection time (seconds) | 1.2 |
| Injection speed (revolutions | 25 |
| Injection pressure (bar) | 50 |
| Screw speed (Revolutions per | 300 |
| Holding pressure (bar) | 40 |
| Holding time (seconds) | 10 |
| Cooling time (seconds) | 15 |

The general procedure for molding the copolymers prepared in Examples 5 and 6 are as follows. The copolymer was collected in the form of strands from the reactor. The strands were then pelletized and injection molded in the form of Petri dishes using the conditions shown in Table 2.

The general procedure for compounding the copolymer prepared in Example 7 with a polycarbonate, and molding the blend is as follows. The copolymer was collected in the form of strands from the reactor. A mixture of the copolymer (200 grams; molecular weight (Mw)=48553, measured using polystyrene standards and having a Tg of 131° C.) was then compounded with a first bisphenol A homopolycarbonate (557.6 grams; Mw=60,000, measured using polystyrene standard), a second bisphenol A homopolycarbonate (p242.4 grams; molecular weight about 40,000 measured using polystyrene standards) and IRGAFOS™ 168 (Ciba) (0.6 grams) and was extruded using a Werner and Pfleiderer™ Twin Screw Extruder, Model ZSK-25 Mega Compounder using the conditions shown in Table 3.

TABLE 3

| Process Parameter | Value |
| --- | --- |
| Temperature Feeding Zone | 93° C. |
| Temperature Zone 1 | 121° C. |
| Temperature Zone 2 | 260° C. |
| Temperature Zone 3 | 271° C. |
| Temperature Zone 4 | 282° C. |
| Temperature of Throat/Die | 289° C. |
| Vacuum Applied | Yes |
| Screw Speed | 400 rpm |
| Temperature of Melt | 321° C. |
| Current/Torque | about 80 amperes |

The extruded strands were then pelletized and injection molded in the form of Petri dishes using the conditions shown in Table 2.

Samples so formed were tested for molecular weight (via GPC using polycarbonate standards), Tg, decomposition temperature (Td, via thermal gravimetric analysis (TGA)), transparency, and amount of polydimethylsiloxane (PDMS-PEG) units in the copolymer used to make the pellets. The amount of PDMS-PEG units in the copolymer is based on the total amount of Bisphenol A units, p-cumyl phenol residues, and PDMS-PEG units.

TABLE 4

| Example | Molecular weight | PDI | Tg, ° C. | Td, ° C. | PDMS-PEG units the copolymer, wt. % | Transmission, %* |
| --- | --- | --- | --- | --- | --- | --- |
| 2 | 50300 | 6.2 | 149 | 432 | 4.6 | 85.4 |
| 3 | 23200 | 3.5 | 140 | 377 | 8.8 | NA |
| 4 | 17300 | 2.3 | 146 | 213 | 8.8 | NA |
| 5** | 66151 | 2.2 | 147 | NA | 5.6 | Opaque |
| 6*** | 46694 | 2.3 | 140 | NA | 2.2 | Opaque |
| 7** | — (Blend) | — (Blend) | | | 2.0 | Opaque |

*Transmission percentage was measured on a 3.2 millimeter thick disk
**Injection molding temperature: 280° C.
***Injection molding temperature: 270° C.

As can be seen from the above results, when the copolymer is prepared using an activated carbonate, the resultant copolymers are opaque.

Example 2 was tasted for rheology and thermal stability. Melt volume rate (MVR, 1.2 kg weight) was measured at 6 minutes and the melt volume rate delayed (MVRd, 1.2 kg weight) was measured at 18 minutes. Time sweep viscosity (TSV) was measured at 30 minutes and 1 radian per second frequency at constant temperature.

TABLE 5

| | MVR 250° C. (cc/10 min) | MVRd 250° C. (cc/10 min) | MVR 300° C. (cc/10 min) | MVRd 300° C. (cc/10 min) | TSV loss at 250° C./30 min | TSV loss at 300° C./30 min |
| --- | --- | --- | --- | --- | --- | --- |
| Ex. 2 | 0.77 | 0.69 | 5.63 | 8.23 | 18 | 58 |

The results of Table 5 show that the copolymer has better thermal stability at 250° C. than at 300° C., since a loss in viscosity is observed at 300° C.

EXAMPLE 9

Platelet Retention

The procedure for measuring platelet retention was carried out in two steps: (1) exposure of blood to the test materials, and (2) measurement of platelet count. The copolymers prepared in Examples 2, 5, 6, and 7 and molded in the form of Petri dishes were tested to measure platelet retention. Blood from human volunteers was collected into an anticoagulant, citrate phosphate dextrose, in commercially available blood collecting pouches. The molded Petri dishes as indicated in Tables 6, 7, and 8 and a Petri dish molded from bisphenol A homopolycarbonate as a control re platelet retention. Blood from human volunteers was collected into an anticoagulant, citrate phosphate dextrose, in commercially available blood collecting pouches. The molded Petri dishes as indicated in Tables 6, 7, and 8 and a Petri dish molded from bisphenol A homopolycarbonate as a control were placed in individual air-tight plastic containers and measures were taken to control the humidity inside the container. To each Petri dish was added 5 milliliters of collected blood sample, and 1 milliliter of the blood sample was withdrawn from the Petri dish immediately for platelet count. The remaining 4 milliliters of the blood was retained in the Petri dish and kept in contact with the Petri dish for about 75 minutes using an Environ shaker at a speed of about 70 to 80 rotations per minute (rpm) at a temperature of about 33° C. to about 37° C. Each copolymer and the homopolymer were tested 5 to 6 times with the same blood sample.

Platelet retention was analyzed by determining the platelet counts in the initial sample and the sample after 75 minutes exposure to the test material, using a Hematology Analyzer (COBAS MINOS VET®, Roche Diagnostics France). The equipment was calibrated using a traceable standard reference control from Bio-Rad, USA. The results of the analysis are provided in Table 6, 7, and 8 below.

TABLE 6

| Sample | Initial total Count in 4.0 milliliters blood (×10$^8$) | Final total Count in 4.0 milliliters blood (×10$^8$) | Platelet retention (%) | Average percentage retention | Standard deviation |
|---|---|---|---|---|---|
| Ex. 2 | 12.4 | 8.52 | 68.7 | 77.6 | 6.9 |
|  | 13.4 | 10.96 | 81.8 |  |  |
|  | 11.56 | 9.2 | 79.6 |  |  |
|  | 12.28 | 8.88 | 72.3 |  |  |
|  | 12.4 | 9.36 | 75.5 |  |  |
|  | 12.2 | 10.72 | 87.9 |  |  |
| BPA PC | 12.48 | 8.16 | 65.4 | 65.9 | 5.3 |
|  | 12.6 | 9 | 71.4 |  |  |
|  | 11.48 | 7.72 | 67.2 |  |  |
|  | 11.4 | 8.12 | 71.2 |  |  |
|  | 12.4 | 7.72 | 62.3 |  |  |
|  | 13.2 | 7.64 | 57.9 |  |  |

TABLE 7

| Sample | Initial total Count in 4.0 milliliters blood (×10$^8$) | Final total Count in 4.0 milliliters blood (×10$^8$) | Percentage retention (%) | Average percentage retention | Standard deviation |
|---|---|---|---|---|---|
| Ex. 5 | 6.32 | 5.64 | 89.2 | 88.0 | 7.4 |
|  | 6.36 | 6.20 | 97.5 |  |  |
|  | 6.56 | 5.72 | 87.2 |  |  |
|  | 6.40 | 5.32 | 83.1 |  |  |
|  | 8.04 | 7.56 | 94.0 |  |  |
|  | 6.24 | 4.80 | 76.9 |  |  |
| Ex. 6 | 7.20 | 6.08 | 84.4 | 85.3 | 5.8 |
|  | 6.48 | 6.20 | 95.7 |  |  |
|  | 7.56 | 6.52 | 86.2 |  |  |
|  | 7.28 | 6.24 | 85.7 |  |  |
|  | 7.36 | 5.96 | 81.0 |  |  |
|  | 7.60 | 6.00 | 78.9 |  |  |
| BPA PC | 8.20 | 4.92 | 60.0 | 60.6 | 3.5 |
|  | 8.36 | 5.56 | 66.5 |  |  |
|  | 8.48 | 5.16 | 60.8 |  |  |
|  | 8.44 | 4.80 | 56.9 |  |  |
|  | 8.84 | 5.08 | 57.5 |  |  |
|  | 8.36 | 5.16 | 61.7 |  |  |

TABLE 8

| Sample | Initial total Count in 4.0 milliliters blood (×10$^8$) | Final total Count in 4.0 milliliters blood (×10$^8$) | Percentage retention (%) | Average percentage retention | Standard deviation |
|---|---|---|---|---|---|
| Ex. 7 | 8.76 | 7.2 | 82.2 | 90.0 | 9.6 |
|  | 9.32 | 8.6 | 92.3 |  |  |
|  | 8.12 | 8.48 | 104.4 |  |  |

TABLE 8-continued

| Sample | Initial total Count in 4.0 milliliters blood ($\times 10^8$) | Final total Count in 4.0 milliliters blood ($\times 10^8$) | Percentage retention (%) | Average percentage retention | Standard deviation |
|---|---|---|---|---|---|
| | 9.08 | 8.24 | 90.7 | | |
| | 9.64 | 7.76 | 80.5 | | |
| BPA PC | 9.48 | 7.8 | 82.3 | 75.1 | 4.2 |
| | 9.56 | 7.12 | 74.5 | | |
| | 9.4 | 6.68 | 71.1 | | |
| | 9.08 | 6.68 | 73.6 | | |
| | 9 | 6.68 | 74.2 | | |

The averages and standard deviations were calculated as usual. The "two sample t test" was performed to show that the platelet retention (%) numbers for the copolymers are statistically higher than for the homopolymer, hence they have better hemocompatibility. A p-value of <0.05 proved the statistically significant difference.

As used herein the singular forms "a," "an" and "the" include plural referents unless the context clearly dictates otherwise. "Optional" or "optionally" means that the subsequently described event or circumstance may or may not occur, and that the description includes instances where the event occurs and instances where it does not. The endpoints of all ranges directed to the same component or property are inclusive of the recited endpoint and are independently combinable. All references are incorporated herein by reference.

Scientific and technical terms have their ordinary meaning as would be understood by one of ordinary skill in the art except where clearly indicated otherwise. Thus, the term "hydrocarbon group" represents means any of a substituted or unsubstituted aliphatic, cycloaliphatic, unsaturated, or aromatic group, or a combination thereof, with the proviso that the term "monovalent hydrocarbon group" excludes a "hydrocarbon group comprising a reactive end-group" and a "monovalent poly(oxyalkyl) hydrocarbon group". The hydrocarbon group may further comprise one or more heteroatoms, such as oxygen, nitrogen, and sulfur. Substituents are generally defined as groups other than a hydrogen atom, and are limited to those groups that do not substantially adversely affect synthesis or use of the copolymers. A carbon atom that is not explicitly substituted by a substituent is presumed substituted by a hydrogen atom.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A polycarbonate-polysiloxane copolymer comprising structural units of the formula

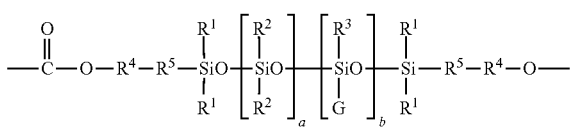

wherein each $R^1$, $R^2$, and $R^3$ is independently the same or different monovalent $C_{1-13}$ hydrocarbon group, G comprises a monovalent $C_{6-1000}$ poly(oxyalkyl) group attached to the silicon atom via a divalent $C_{2-20}$ hydrocarbon linking group, each $R^4$ and $R^5$ taken together is independently the same or different divalent $C_{3-30}$ hydrocarbon linking group wherein $R^4$ is a $C_{1-28}$ hydrocarbon and $R^5$ is a $C_{2-29}$ aliphatic group, a is 0 or greater, and b is one or greater; and structural units of the formula

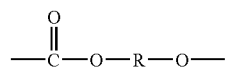

wherein each R is independently the same or different $C_{1-60}$ divalent hydrocarbon group, and at least 60% of the R groups comprise an aromatic moiety.

2. The copolymer of claim 1, wherein G is of the formula

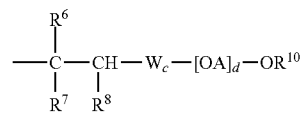

wherein each $R^6$, $R^7$, and $R^8$ are independently the same or different hydrogen atom or a monovalent $C_{1-8}$ hydrocarbon group, $R^{10}$ is a monovalent $C_{1-10}$ hydrocarbon group, W is a divalent $C_{1-18}$ hydrocarbon group, A is a divalent $C_{1-6}$ alkyl, c is 1, and d is 1 to 100.

3. The copolymer of claim 1, wherein G is of the formula

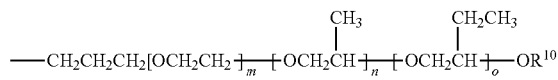

wherein $R^{10}$ is a hydrogen atom or a $C_{1-8}$ monovalent hydrocarbon group, m is 0 to 20, n is 0 to 20, and o is 0 to 20, provided that m+n+o is 1 to 20.

4. The copolymer of claim 3, wherein m is 2 to 20, n is zero, o is zero, and $R^{10}$ is a $C_{1-4}$ alkyl group.

5. The copolymer of claim 1, wherein a is 5 to 200, and b is 1 to 100.

6. The copolymer of claim 1, wherein a is 22 to 45, and b is 3 to 15.

7. The copolymer of claim 1, wherein each $R^4$ is independently the same or different substituted or unsubstituted $C_{6-28}$ aromatic group, and each $R^5$ is independently the same or different substituted or unsubstituted $C_{2-29}$ aliphatic group.

8. The copolymer of claim 7, wherein each $R^4$ and $R^5$ taken together are the same, and are a group of the formula

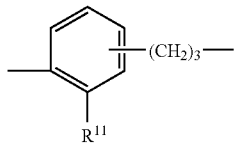

wherein $R^{11}$ is a hydrogen atom or a $C_{1-6}$ alkoxy group.

9. The copolymer of claim 8, wherein each $R^4$ and $R^5$ taken together is the same, and is a group of the formula

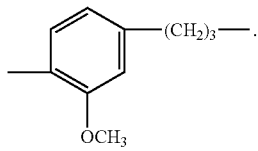

10. The copolymer of claim 1, wherein R is derived from an aromatic dihydroxy compound of the formula:

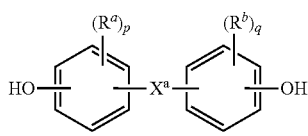

wherein $R^a$ and $R^b$ each represent a halogen or $C_{1-12}$ alkyl group and can be the same or different, p and q are each independently integers of 0 to 4, and $X^a$ represents a bridging group, wherein the bridging group and the hydroxy substituent of each aromatic are disposed ortho, meta, or para to each other, and $X^a$ is single bond, —O—, —S—, —S(O)—, —S(O)$_2$—, —C(O)—, or a divalent $C_{1-18}$ hydrocarbon group.

11. The copolymer of claim 10, wherein p and q are each zero, and $X^a$ is isopropylidene.

12. The copolymer of claim 1, having a transparency of at least 50% when measured on a sample 3.2 mm thick in accordance with ASTM D1003-00.

13. A composition comprising the copolymer of claim 1 and a polycarbonate homopolymer, a polycarbonate copolymer different from the copolymer of claim 1, a polycarbonate-polyester, a polyester, or a combination comprising at least one of the foregoing polymers.

14. The composition of claim 13, comprising, based on the total weight of the polymers in the composition, 0.5 to 99.5 weight percent of a polycarbonate bisphenol A homopolymer.

15. An article comprising the polycarbonate-polysiloxane copolymer of claim 1.

16. The article of claim 15, further comprising, based on the total weight of the polymers in the composition, 0.5 to 99.5 weight percent of a polycarbonate bisphenol A homopolymer.

17. The article of claim 15, in the form of a medical device.

18. A method of making an article comprising molding, shaping, or forming a composition comprising the polycarbonate-polysiloxane copolymer of claim 1 to form the article.

19. The method of claim 18, comprising molding the composition.

20. The method of claim 19, wherein the composition further comprises, based on the total weight of the polymers in the composition, 0.5 to 99.5 weight percent of a polycarbonate bisphenol A homopolymer.

21. A method of preparing a polycarbonate-polysiloxane copolymer, comprising polymerizing a dihydroxy silicone the formula

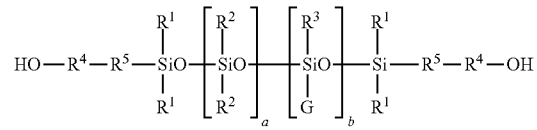

wherein each $R^1$, $R^2$, and $R^3$ is independently the same or different monovalent $C_{1-13}$ hydrocarbon group, G comprises a monovalent $C_{6-1000}$ poly(oxyalkyl) group attached to the silicon atom via a divalent $C_{2-20}$ hydrocarbon linking group, each $R^4$ and $R^5$ taken together is independently the same or different divalent $C_{1-30}$ hydrocarbon linking group wherein $R^4$ is a $C_{1-28}$ hydrocarbon and $R^5$ is a $C_{2-29}$ aliphatic group, a is 0 or greater, and b is one or greater, with a compound of the formula

HO—R—OH wherein each R is independently the same or different $C_{6-60}$ divalent hydrocarbon group, and at least 60% of the R groups comprise aromatic moieties, in the presence of a carbonate precursor, to provide the polycarbonate-polysiloxane copolymer of claim 1.

22. The method of claim 21, wherein the polymerizing is a melt process, using diphenyl carbonate, bis(methylsalicyl) carbonate, or a combination comprising at least one of the foregoing carbonate as the carbonate precursor.

23. The method of claim 21, wherein the polymerizing is an interfacial polymerization process conducted in the presence of a solvent, a caustic, and optionally one or more catalysts, and wherein the carbonate precursor is phosgene.

24. The method of claim 23, wherein polymerizing comprises reacting bisphenol A with phosgene in a biphasic solvent in the presence of a phase transfer catalyst to form a bischloroformate; and adding the dihydroxy silicone to form the copolymer.

25. The method of claim 23, wherein the chloroformates of the dihydroxy silicone are formed in a tube reactor, and then added into an interfacial polycondensation reactor with catalyst.

26. A polycarbonate-polysiloxane copolymer comprising structural units of the formula

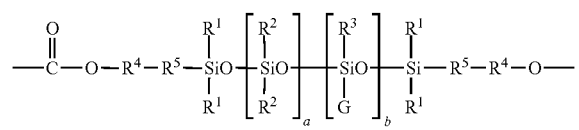

wherein each $R^1$, $R^2$, and $R^3$ is independently the same or different monovalent $C_{1-13}$ hydrocarbon group, each $R^4$ and $R^5$ taken together is independently the same or different divalent $C_{3-30}$ hydrocarbon linking group wherein $R^4$ is a $C_{1-28}$ hydrocarbon and $R^5$ is a $C_{2-29}$ aliphatic group, a is 0 or greater, and b is one or greater, and wherein G is of the formula

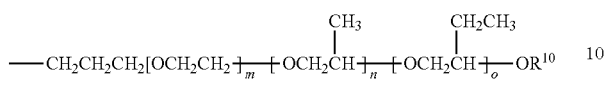

wherein $R^{10}$ is a hydrogen atom or a $C_{1-8}$ monovalent hydrocarbon group, m is 0 to 20, n is 0 to 20, and o is 0 to 20, provided that m+n+o is 1 to 20; and structural units of the formula

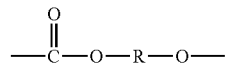

wherein each R is independently the same or different $C_{1-60}$ divalent hydrocarbon group, and at least 60% of the R groups comprise an aromatic moiety.

* * * * *

UNITED STATES PATENT AND TRADEMARK OFFICE
CERTIFICATE OF CORRECTION

| | | |
|---|---|---|
| PATENT NO. | : 7,888,447 B2 | |
| APPLICATION NO. | : 11/693006 | |
| DATED | : February 15, 2011 | |
| INVENTOR(S) | : Dhara et al. | |

It is certified that error appears in the above-identified patent and that said Letters Patent is hereby corrected as shown below:

Abstract, Page 1, delete "should this be C1-C13 like in the document?"

Signed and Sealed this
Twenty-sixth Day of April, 2011

David J. Kappos
*Director of the United States Patent and Trademark Office*